US011348085B2

(12) United States Patent
Molnar et al.

(10) Patent No.: US 11,348,085 B2
(45) Date of Patent: May 31, 2022

(54) PAYMENT SYSTEM

(71) Applicant: AFTERPAY PTY LTD, Melbourne (AU)

(72) Inventors: Nicholas Molnar, Melbourne (AU); David Whiteman, Melbourne (AU)

(73) Assignee: AFTERPAY PTY LTD, Melbourne (AU)

( * ) Notice: Subject to any disclaimer, the term of this patent is extended or adjusted under 35 U.S.C. 154(b) by 208 days.

(21) Appl. No.: 16/317,450

(22) PCT Filed: Jul. 13, 2017

(86) PCT No.: PCT/AU2017/050723
§ 371 (c)(1),
(2) Date: Jan. 11, 2019

(87) PCT Pub. No.: WO2018/009977
PCT Pub. Date: Jan. 18, 2018

(65) Prior Publication Data
US 2019/0228399 A1 Jul. 25, 2019

(30) Foreign Application Priority Data
Jul. 13, 2016 (AU) ............................... 2016902755

(51) Int. Cl.
*G06Q 30/00* (2012.01)
*G06Q 20/28* (2012.01)
(Continued)

(52) U.S. Cl.
CPC ............. *G06Q 20/28* (2013.01); *G06Q 20/20* (2013.01); *G06Q 20/202* (2013.01); *G06Q 20/24* (2013.01);
(Continued)

(58) Field of Classification Search
CPC ...................................................... G06Q 40/00
(Continued)

(56) References Cited

U.S. PATENT DOCUMENTS

| 2009/0112744 | A1* | 4/2009 | Park | G06Q 40/025 |
| | | | | 705/34 |
| 2011/0208659 | A1 | 8/2011 | Easterly et al. | |
| 2014/0129422 | A1* | 5/2014 | Zhou | G06Q 40/025 |
| | | | | 705/38 |

FOREIGN PATENT DOCUMENTS

WO  WO-2011/140301 A1  11/2011

OTHER PUBLICATIONS

NPL Search History.*
(Continued)

*Primary Examiner* — John H. Holly
(74) *Attorney, Agent, or Firm* — Marshall, Gerstein & Borun LLP

(57) ABSTRACT

A computer-implemented method for facilitating payment of a total amount comprising multiple future instalments by a customer (3), the method comprising: receiving, at an instalment payment server (5), an indication from a mobile device (7) associated with the customer (3) to set up the payment by the multiple future instalments; generating first authorisation data indicative of an authorisation of the multiple future instalments; sending the first authorisation data to a mobile device (7). The method may include displaying on the mobile device (7) an optical machine readable representation of the first authorisation data; and scanning, by a merchant POS system (13) associated with a merchant (11), the optical machine readable representation of the first authorisation data from the mobile device (7). The method also comprise: receiving, by the merchant POS system (13), purchasing data for a purchase of one or more goods or services for the total amount; and sending the purchasing (Continued)

data, merchant data and second authorisation data representing the scanned optical machine readable representation to the instalment payment server (5). The method further comprises: determining, by the instalment payment server (5), the customer (3) based on the second authorisation data; and determining validity of multiple future instalments based on the total amount and the authorisation of the multiple future instalments of the determined customer. Based on determining the validity of multiple future instalments, the method comprises: sending a continuation to the merchant POS system (13) to cause the merchant POS system (13) to generate an indication that the one or more goods or services (21) can be released to the customer (3); and initialing the multiple future instalments at respective points in time.

13 Claims, 8 Drawing Sheets

(51) Int. Cl.
*G06Q 40/02* (2012.01)
*G06Q 20/32* (2012.01)
*G06Q 20/20* (2012.01)
*G06Q 20/42* (2012.01)
*G06Q 20/24* (2012.01)

(52) U.S. Cl.
CPC ..... *G06Q 20/3223* (2013.01); *G06Q 20/3274* (2013.01); *G06Q 20/425* (2013.01); *G06Q 40/02* (2013.01)

(58) Field of Classification Search
USPC .......... 705/39, 38, 79, 34, 44, 14.53, 67, 64; 713/171
See application file for complete search history.

(56) References Cited

OTHER PUBLICATIONS

ProQuestDialogNPL Search History.*
Written Opinion of the International Searching Authority issued in PCT Patent Application No. PCT/AU2017/050723 dated Aug. 31, 2017.
International Search Report issued in PCT Patent Application No. PCT/AU2017/050723 dated Aug. 31, 2017.

* cited by examiner

PAYMENT SYSTEM

TECHNICAL FIELD

The present disclosure relates to methods and systems for facilitating payment in relation to goods or services during transactions with a point of sale (POS) system between a merchant and customer.

BACKGROUND

A point of sale (POS) system may include an electronic terminal of a merchant that can receive credit card and/or debit card details of a customer. The received details may be sent to a payment server whereby an electronic payment may be made from a customer account associated with the customer (such as a credit card account or savings account) to a merchant account associated with the merchant.

In some circumstances, a customer may not have sufficient funds available from the customer account to pay for goods or services for the full total value. In some examples, a lay-by agreement (also known as layaway agreement) may be made between the customer and merchant. In a lay-by agreement, the customer informs the merchant of the intention to purchase the specified goods or services. The merchant agrees to reserve (i.e. hold) the item for the customer. The customer, in turn, makes periodic payments until the total amount paid to the merchant satisfies the merchant as payment for the goods or services. This is advantageous for the customer as they may have confidence that the goods or services have been put aside for the customer.

Disadvantages of lay-by include the merchant having to store the item for a period of time, and which may have associated costs (e.g. cost of warehousing, interest costs of having inventory, etc.). Furthermore, the customer typically does not have access to the goods or services until all payments are made.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

A computer-implemented method for facilitating payment of a total amount comprising multiple future instalments by a customer, the method comprising: receiving, at an instalment payment server, an indication from a mobile device associated with the customer to set up the payment by the multiple future instalments; generating first authorisation data indicative of an authorisation of the multiple future instalments; sending the first authorisation data to a mobile device; displaying on the mobile device an optical machine readable representation of the first authorisation data; scanning, by a merchant POS system associated with a merchant, the optical machine readable representation of the first authorisation data from the mobile device; receiving, by the merchant POS system, purchasing data for a purchase of one or more goods or services for the total amount; sending the purchasing data, merchant data and second authorisation data representing the scanned optical machine readable representation to the instalment payment server; determining, by the instalment payment server, the customer based on the second authorisation data; determining, by the instalment payment server, validity of multiple future instalments based on the total amount and the authorisation of the multiple future instalments of the determined customer. Based on determining the validity of multiple future instalments, the method further comprises: sending a confirmation to the merchant POS system to cause the merchant POS system to generate an indication that the one or more goods or services can be released to the customer; and initiating the multiple future instalments at respective points in time.

The computer-implemented method may further comprise determining the multiple future instalments based on the total amount and the authorisation of the multiple future instalments of the determined customer. It is to be appreciated that in further examples, determining the multiple future instalments may be at least part of a process of determining the validity of multiple future instalments.

In the computer-implemented method, the step of receiving an indication from a mobile device to set up the payment by the multiple future instalments may further comprise: receiving a request to preapprove a proposed total amount, wherein the step of generating the first authorisation data indicative of an authorisation of the multiple future instalments is conditional on: determining the proposed total amount is less than or equal to a specified maximum amount for the customer.

In the computer-implemented method, the first authorisation data comprises an initial portion, wherein the initial portion has an associated initial time window and determining the validity of multiple future transactions is based on determining that the optical machine representation of the initial portion was scanned by the merchant POS system during the associated initial time window. The method further comprises sending one or more subsequent portions of the first authorisation data, wherein the subsequent portion has an associated subsequent time window, and determining the validity of multiple future transactions is based on determining that the optical machine representation of the subsequent portion was scanned by the merchant POS system during the associated subsequent time window.

The computer-implemented method may further comprise the step of: receiving a deposit value from a customer before the step of sending a confirmation to the merchant POS system.

In some examples of the computer-implemented method, the deposit value may be proportional to the total amount or the proposed total amount. In some examples, the deposit value is equal or greater than a first multiple future instalment from the multiple future instalments.

In the computer-implemented method, the optical machine readable representation of the first authorisation data is a barcode or QR code.

In the computer-implemented method, the step of generating the first authorisation data indicative of an authorisation of the multiple future instalments may be conditional on determining authority to debit a customer bank account for the multiple future instalments.

The computer-implemented method may further comprise: receiving, at the POS system, an indication that the customer intends payment for the total amount by multiple future instalments and a customer identifier; receiving, at the instalment payment server a request to set up the payment by the multiple future instalments and the customer identifier; and sending, to the mobile device, a request for confirmation to set up the payment by the multiple future instalments, wherein confirmation includes the indication from the mobile device to set up the multiple future instalments.

A payment system for facilitating payment of a total amount comprising multiple future instalments by a customer, the method comprising: a mobile device associated with a customer; an instalment payment server; and a merchant POS system associated with merchant. The system comprises one or more processing devices associated with the mobile device, instalment payment server and merchant POS system configured to: receive, at an instalment payment server, an indication from a mobile device to set up the payment by the multiple future instalments; generate, at an instalment payment server, first authorisation data indicative of an authorisation of the multiple future instalments; send the first authorisation data to a mobile device; display, on the mobile device, an optical machine readable representation of the first authorisation data; scan, by a merchant POS system, the optical machine readable representation of the first authorisation data from the mobile device; receive, by the merchant POS system, purchasing data for a purchase of one or more goods or services for the total amount; send, the purchasing data, merchant data and second authorisation data representing the scanned optical machine readable representation to the instalment payment server; determine, by the instalment payment server, the customer based on the second authorisation data; determine, by the instalment payment server, the validity of multiple future instalments based on the total amount and the authorisation of the multiple future instalments of the determined customer. Based on determining the validity of the multiple future instalments, the one or more processing devices are further configured to: send a confirmation to the merchant POS system to cause the merchant POS system to generate an indication that the one or more goods or services can be released to the customer; and initiate, by the instalment payment server, the multiple future instalments at respective points in time.

A computer-implemented method for facilitating payment of a total amount comprising multiple future instalments by a customer, wherein the method is performed by an instalment payment server, the method comprising: receiving, over a communications network, an indication from a mobile device associated with a customer to set up the payment by the multiple future instalments; generating first authorisation data indicative of an authorisation of the multiple future instalments; sending, over the communications network, the first authorisation data to a mobile device to generate, at a display on the mobile device, an optical machine readable representation of the first authorisation data. The method also comprises receiving, over the communications network from a merchant POS system associated with the merchant: purchasing data for a purchase of one or more goods or services for the total amount; merchant data; and second authorisation data representing a scanned optical readable representation of the first authorisation data. The method further comprises: determining the customer based on the second authorisation data; and determining the validity of multiple future instalments based on the total amount and the authorisation of the multiple future instalments of the determined customer. Based on determining the validity of multiple future instalments, the method further comprises: sending a confirmation, over the communications network, to the merchant POS system to cause the merchant POS system to generate an indication that the one or more goods or services can be released to the customer; and initiating the multiple future instalments at respective points in time.

An instalment payment server for facilitating payment of a total amount comprising multiple future instalments by a customer, wherein the instalment payment server comprises a first processing device configured to: receive, over a communications network, an indication from a mobile device associated with a customer to set up the payment by the multiple future instalments; generate first authorisation data indicative of an authorisation of the multiple future instalments; send, over the communications network, the first authorisation data to a mobile device to generate, at a display on the mobile device, an optical machine readable representation of the first authorisation data. The first processing device is further configured to receive, over the communications network from a merchant POS system associated with the merchant: purchasing data for a purchase of one or more goods or services for the total amount; merchant data; and second authorisation data representing a scanned optical readable representation of the first authorisation data. The first processing device is further configured to: determine the customer based on the second authorisation data; determine validity of multiple future instalments based on the total amount and the authorisation of the multiple future instalments of the determined customer. Based on determining the validity of multiple future instalments, the first processing device is further configured to: send a confirmation, over the communications network, to the merchant POS system to cause the merchant POS system to generate an indication that the one or more goods or services can be released to the customer; and initiate the multiple future instalments at respective points in time.

A computer-implemented method for facilitating payment of a total amount comprising multiple future instalments by a customer, wherein the method is performed by a mobile device associated with a customer, the method comprising: sending, over a communications network to an instalment payment server, an indication to set up the payment by the multiple future instalments; receiving, over a communications network from the instalment payment server, first authorisation data indicative of an authorisation of the multiple future instalments; displaying, on the mobile device, an optical machine readable representation of the first authorisation data such that the optical machine readable representation is scanned by a point of sale (POS) system, wherein a second authorisation data representing the first authorisation data is used to determine the customer, and wherein to determine validity of the multiple future instalments is based on: a total amount associated with a purchase of goods or services by the customer; and the authorisation of the multiple future instalments of the determined customer.

In the computer-implemented method, sending an indication to set up the payment by the multiple future instalments comprises: sending a request to preapprove a proposed total amount, wherein receiving the first authorisation data is conditional on the proposed total amount to be less than or equal to a specified maximum amount for the customer.

In the computer-implemented method, the first authorisation data comprises an initial portion, wherein the initial portion has an associated initial time window and determining the validity of multiple future transactions is based on determining that the optical machine representation of the initial portion was scanned by the merchant POS system during the associated initial time window. The method further comprises sending one or more subsequent portions of the first authorisation data, wherein the subsequent portion has an associated subsequent time window, and determining the validity of multiple future transactions is based on determining that the optical machine representation of the subsequent portion was scanned by the merchant POS system during the associated subsequent time window.

In the computer-implemented method, wherein the optical machine readable representation of the first authorisation data is a barcode or QR code.

A mobile device for facilitating payment of a total amount comprising multiple future instalments by a customer, wherein the mobile device is associated with a customer, wherein the mobile device comprises a second processing device configured to: send, over a communications network to an instalment payment server, an indication to set up the payment by the multiple future instalments; receive, over a communications network from the instalment payment server, first authorisation data indicative of an authorisation of the multiple future instalments; generate, at a display on the mobile device, an optical machine readable representation of the first authorisation data such that the optical machine readable representation is scanned by a point of sale (POS) system. A second authorisation data representing the first authorisation data is used to determine the customer, and wherein to determine validity of the multiple future instalments is based on: a total amount associated with a purchase of goods or services by the customer; and the authorisation of the multiple future instalments of the determined customer.

A computer-implemented method for facilitating payment of a total amount comprising multiple future instalments by a customer, wherein the method is performed by a merchant point of sale (POS) system, the method comprising: receiving purchasing data for a purchase of one or more goods or services for the total amount; scanning, by an optical scanner, from a display of a mobile device associated with the customer, an optical machine readable representation of first authorisation data from the mobile device. The method further comprises sending, over a communications network, to an instalment payment server: the purchasing data; merchant data; and second authorisation data representing the scanned optical machine readable representation, wherein the instalment payment server determines validity of multiple future instalments based on the total amount and the authorisation of the multiple future instalments of the determined customer. Based on the validity of multiple future instalments, the method further comprises: receiving, over the communications network, a confirmation from the instalment payments server; and generating, at a display associated with the POS system, an indication that the one or more goods or services can be released to the customer.

The computer implemented method further comprises: receiving an indication that the customer intends payment for the total amount by multiple future instalments and a customer identifier; and sending, over the communications network, a request to the instalment server to set up the payment by the multiple future instalments and the customer identifier.

A merchant point of sale (POS) system for facilitating payment of a total amount comprising multiple future instalments by a customer, wherein the merchant POS system is associated with a merchant, wherein the merchant POS system comprises: an optical scanner for scanning optical machine readable representations; and a third processing device. The third processing device is configured to: receive purchasing data for a purchase of one or more goods or services for the total amount; scan, by the optical scanner, from a display of a mobile device associated with the customer, an optical machine readable representation of first authorisation data from the mobile device. The third processing device is further configured to: send, over a communications network, to an instalment payment server: the purchasing data; merchant data; and second authorisation data representing the scanned optical machine readable representation, wherein the instalment payment server determines validity of multiple future instalments based on the total amount and the authorisation of the multiple future instalments of the determined customer. Based on the validity of multiple future instalments, the third processing device is further configured to: receive, over the communications network, a confirmation from the instalment payments server; and generate, at a display associated with the POS system, an indication that the one or more goods or services can be released to the customer.

In the description and claims, the term "goods or services" should be interpreted as meaning: (i) a good, (ii) both a good and a service, or (iii) a service. It is also to be appreciated that the term also includes multiple goods and multiple services and combinations thereof.

BRIEF DESCRIPTION OF DRAWINGS

Examples of the present disclosure will be described with reference to.

DESCRIPTION OF EMBODIMENTS

Overview

Figure 1:
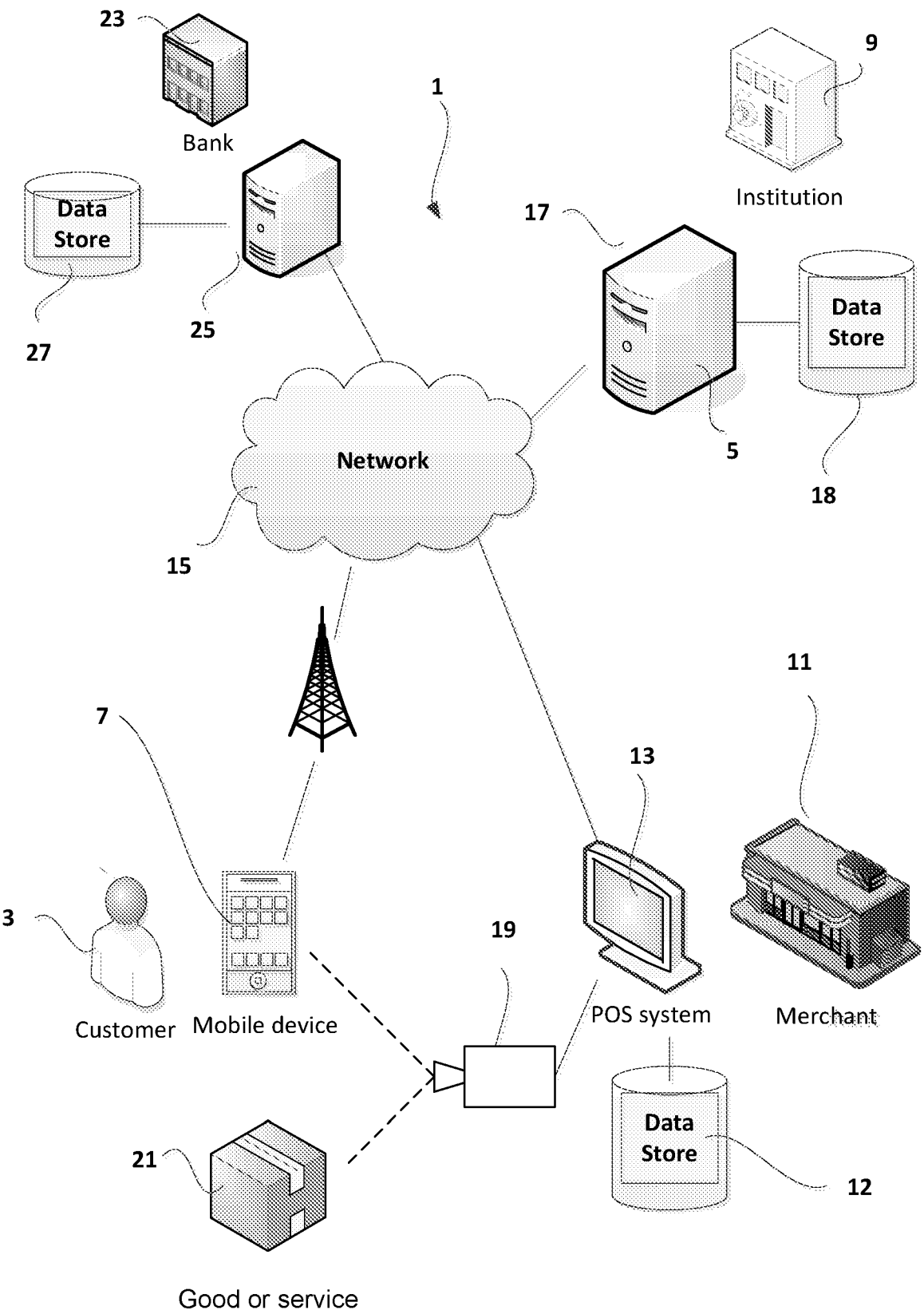
FIG. 1 is a schematic diagram of an example system for facilitating payment of a total amount comprising multiple future instalments by a customer.

A system 1 for facilitating payment of a total amount comprising multiple future instalments by a customer 3 will now be described with reference to FIG. 1. The system 1 includes an instalment payment server 5 associated with an institution 9, a mobile device 7 associated with a customer 3, and a merchant point of sale (POS) system 13 associated with a merchant 11.

The instalment payment server 5 has a first processing device 17 to perform one or more of the computer-implemented methods described herein and a server data store 18. The instalment server 5 is in communication, over a communications network 15, with both the mobile device 7 and the POS system 13. The instalment server 5 may also be in communication with a financial service provider 23 having a financial service provider processing device 25 and associated data store 27.

The mobile device 7 may be a mobile communication device such as a smartphone, tablet, etc. that may typically be in the possession of a customer 3. The mobile device 7 may have one or more user interfaces, including a display (that may also include a touchscreen display), one or more buttons, microphones, etc. The display of the mobile device 7 may be configured to display an optical machine readable representation, such as a barcode, quick response (QR) code, etc. The mobile device 7 also includes a second processing device (not shown) to perform one or more of the computer-implemented methods described herein.

The merchant POS system 13 includes an optical scanner 19 for scanning optical machine-readable representations. The optical machine-readable representations may include a barcode or QR code displayed on the mobile device 7. The optical scanner 19 may also read optical machine-readable representations associated with goods or services 21 (such as on a label or tag). The merchant POS system 13 also includes a third processing device (not shown) to perform one or more of the computer-implemented methods described herein.

Overview of the Method

The system 1 may perform the computer-implemented method 100, 200, 300 described below for facilitating payment of a total amount 31 comprising multiple future instalments 33 by a customer 3. Referring to the example in FIGS. 2 and 3, the customer 3 may wish to purchase the goods or services 21 from the merchant 11. Instead of an upfront payment of the total amount 31 for the goods or services 21, the customer 3 may wish to make payments in instalments, including multiple future instalments 33. The system 1 facilitates this by performing the following method 100, 200, 300.

The instalment payment server 5 receives 210 an indication from a mobile device 7 to set up the payment by the multiple future instalments. This may be in the form of a request sent from the mobile device 7 to set up the payment and/or a confirmation sent from the mobile device 7. The payment by multiple future instalments may include particular terms, such as a specified maximum for the total amount and the value and timing of the multiple future instalments.

The method then includes generating 220 first authorisation data indicative of an authorisation of the multiple future instalments. In some examples, this is performed at the instalment payment server 5. The first authorisation data is then sent 230 to the mobile device 7.

The mobile device 7 then displays 130 an optical machine readable representation of the first authorisation data. In one example, this may include a barcode that may be used to identify the customer (3) who is authorised to make transactions that include a payment for the total amount in multiple future instalments 33.

The optical machine representation of the first authorisation data is then scanned 310 by the optical scanner 19 at the merchant POS system 13 of the merchant.

The method further includes receiving 320, by the merchant POS system 13, purchasing data for a purchase of one or more goods or services 21 for the total amount 31. In some examples, this may include scanning a barcode associated with the goods or services 21. In other examples, this may include the merchant 11 or customer 3 selecting the goods or services 21 at a terminal associated with the POS system 13. It is to be appreciated that in various examples, this step may be done before or after the step of scanning 310 the optical machine readable representation of the first authorisation data.

The method further includes sending 330 purchasing data, merchant data and second authorisation data to be received 240 at the instalment payment server 5. The purchasing data may include, for example, the price (i.e. value or total value) of the goods or services 21. The merchant data may include information in relation to the merchant 11, such as a merchant identifier so that the institution 9 and/or financial service provider 21 can send information to the merchant 11 and/or arrange payment to the merchant 11. The second authorisation data represents the scanned optical machine readable representation of the first authorisation data. This information may be used at the instalment payment server 5 to determine 250 the particular customer 3 that is transacting with the merchant 11. It may also allow the instalment payment server 5 to determine a particular authorisation for payment by multiple future instalments.

The method includes determining 260, at the instalment payment server 5, the validity of multiple future instalments. Determining the validity may be based on the total amount and the authorisation of the multiple future instalments for the determined customer. In some examples, this may include determining that the total amount does not exceed a specified maximum threshold for the customer (or for the particular authorisation of the multiple future instalments for that customer).

In some examples, determining the validity of the multiple future instalments may include determining the specific value of each of the multiple future instalments 33 that is payable by the customer 3. This determination is based on the total amount, as provided by the purchasing data, and the determined customer 3. For example, this may include comparing the total amount with particular terms that have been authorised for the particular customer, such as the specified maximum for the total amount (or cumulative value of the total amounts of other transactions for that customer that remain outstanding), and the number of instalment payments. This may then be used to specify the value of the multiple future payments 33 and when they fall due.

Based on determining valid multiple future instalments, the method further includes sending 270 a confirmation to the merchant POS system 13 to cause the merchant POS system 13 to generate an indication that the one or more goods or services 21 can be released to the customer 3. For example, this may be a visual indication at a display of an operator terminal at the merchant 11.

The method further includes initiating 280 the multiple future instalments at respective points in time. For example this may include sending to the financial service provider 23 a request to debit a customer account for the multiple future instalments at respective points in time. In another example, this may include sending requests to the customer 3 to make the multiple future instalments at respective times.

Figure 3:
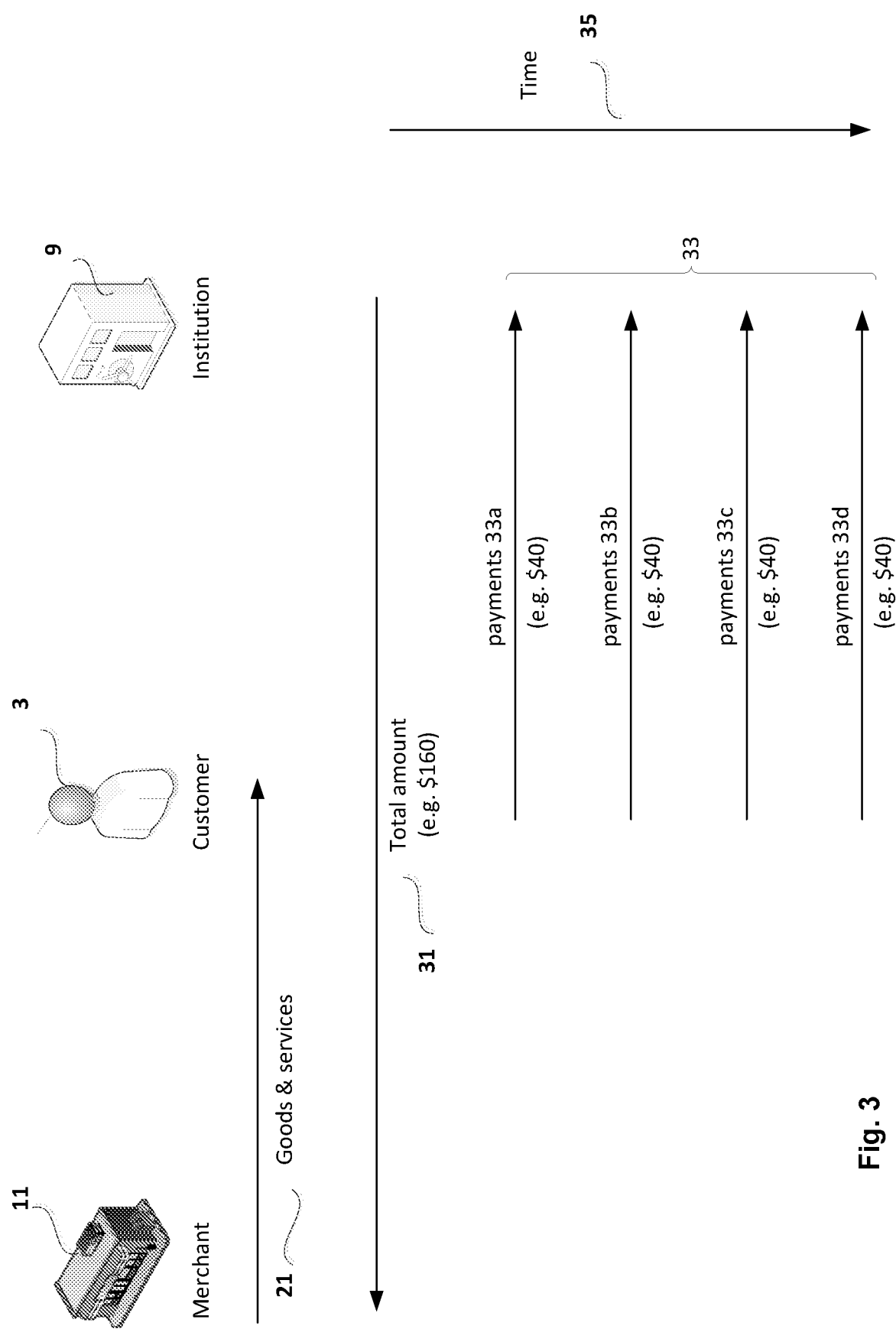
FIG. 3 is a diagram showing a transaction using the system and method of FIGS. 1 and 2.

Referring to FIG. 3, the customer 3 makes the instalment payments 33a, 33b, 33c, etc. over a period of time 35. In one example, the sum of all the multiple future instalments 33 will be sufficient to satisfy payment of the total amount 31. In one example, the sum of the multiple future instalments 33 equals the total amount 31. Therefore assuming the customer 3 makes all the multiple future instalments 33, the customer would have covered payment for the total amount 31.

The payment to the merchant 11 may be made by the institution 9 on behalf of the customer 3. In one example, the institution 9 may make a payment equivalent to the total amount 31 to the merchant 11 at, or temporally close to, the time of sending 270 the confirmation to release the goods or services 21 to the customer 3. Therefore the merchant 11 can be satisfied that they have, or will, be paid the total amount for the goods or services 21 that they are releasing. Alternatively, the institution 9 may direct the financial service provider 23 to pay the total amount to the merchant 11.

Detailed non-limiting examples of the method will now be described.

Figure 2:
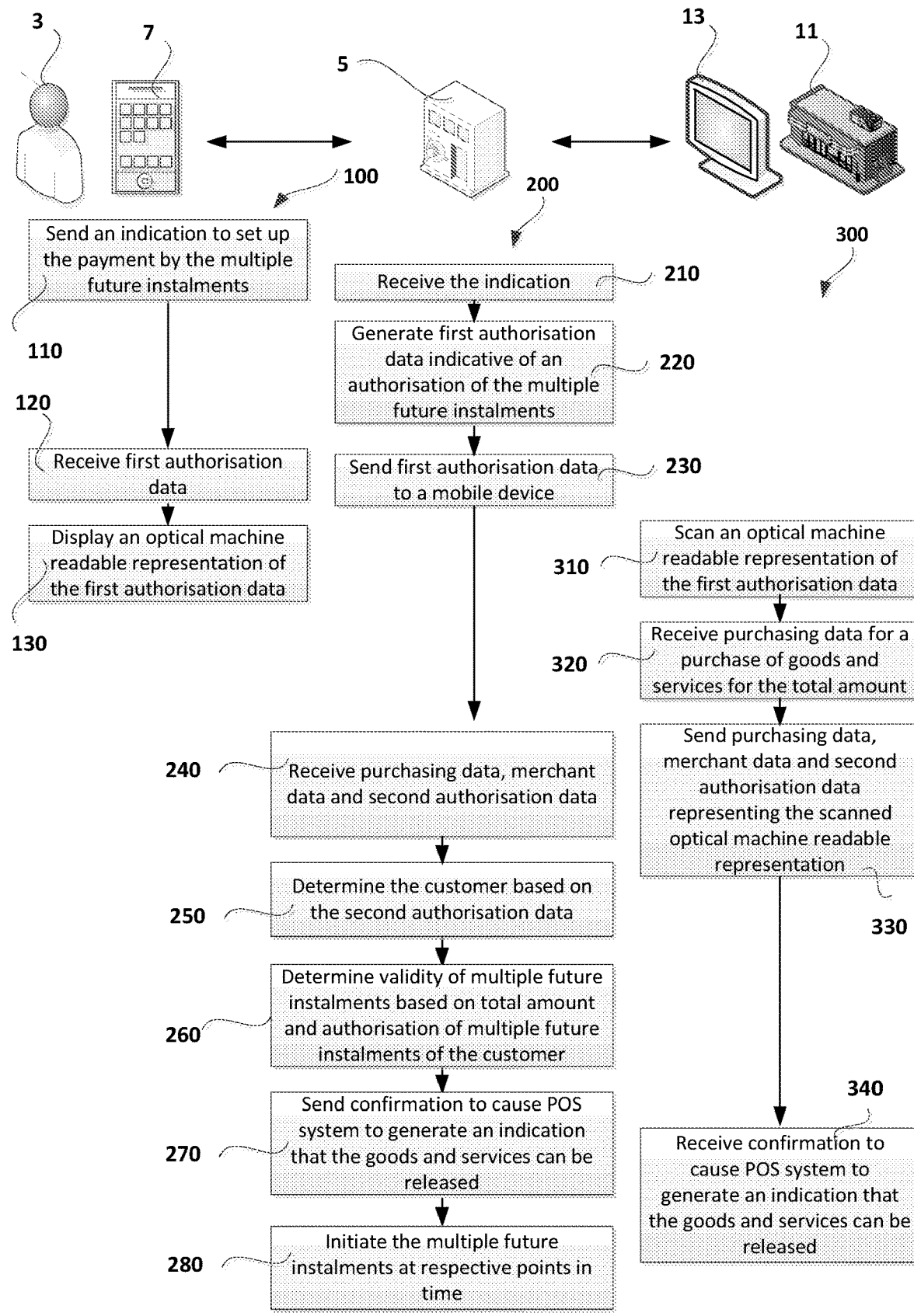
FIG. 2 is a flow chart of a computer-implemented method of facilitating payment of a total amount comprising multiple future instalments by a customer.
Figure 4:
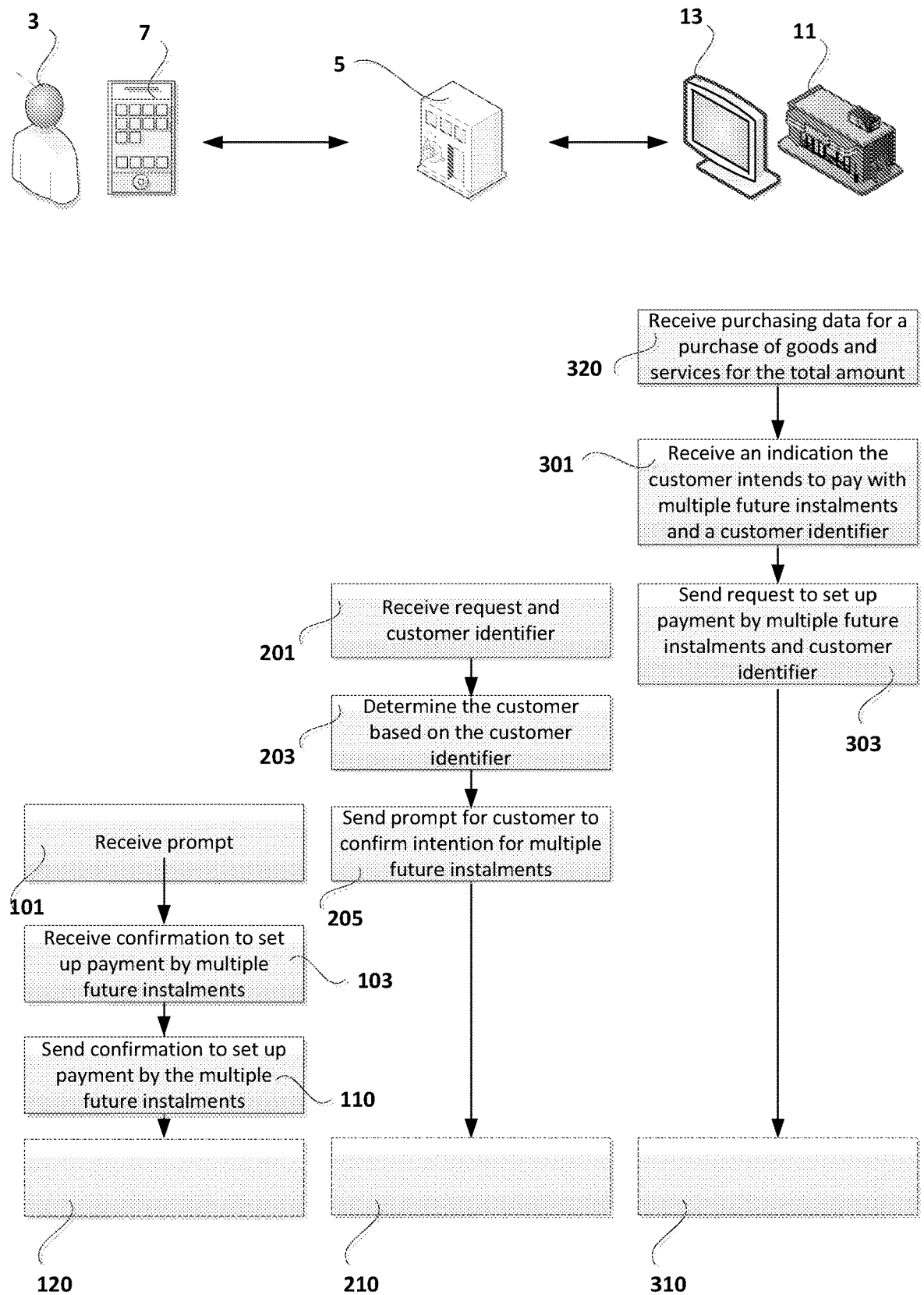
FIG. 4 is a flow chart of the computer-implemented method that is initiated at a merchant POS system during checkout.

Example of Facilitating Payment Initiated at the Merchant POS System During Checkout A detailed example of facilitating payment that is initiated at the POS terminal will now be described with reference to FIGS. 2, 4 and 5.

The customer 3 may approach a merchant 13 at the POS system 13 to settle a transaction for the goods or services 21. The merchant 13 may then receive 320 purchasing data for the goods or services 21 by scanning a barcode of the goods or services 21 with the optical scanner 19, whereby the barcode may provide the purchasing data itself or a pointer to purchasing data in a data store 12 associated with the merchant 11. In other examples, the merchant 11 may enter details of the purchasing data via a user interface, or select items on the user interface indicative of the goods or services 21. If the customer is purchasing multiple items of goods or services 21, the POS system 13 may add the respective values to provide the total amount.

The customer 3 may then indicate to the merchant 11 that they wish to make the payment by multiple future instalments. Thus the POS system 13 may then receive 301 an indication that the customer 3 intends pay for the total amount 31 by multiple future instalments 33 as well as a customer identifier. The customer identifier may be an identifier that the customer 3 is willing to provide to the POS system 13. For example, this may include a phone number, an email address, a customer name, a customer number or other customer alias.

Assume for this example that the customer identifier is a mobile phone number associated with the customer 3 and the mobile device 7. The POS system 13 then sends 303, over the communications network 15, to the instalment payment server 5, a request to set up the payment by the multiple future instalments 33 and the customer identifier. In some examples, this may also include sending the purchasing data so that the total amount can be determined by the instalment payment server 5.

The indication and the customer identifier is then received 201 by the instalment payment server 5. In response the instalment payment server 5 may then determine 203, based on the customer identifier, the particular customer 3 and any respective customer records. Such records may include contact details, history of the customer, alerts, loyalty information etc. The instalment payment server 5 then sends 205, over the communications network 15, to be received 101 at the mobile device 7 of the particular customer 3, a prompt for the customer 3 to confirm that they intend to make payment for the total amount by multiple future instalments. This may include sending details of the purchasing data and the merchant 11 for the customer 3 to consider.

The customer 3 may then confirm this intention. In one example, this may include the mobile device 7 receiving 101, at a user interface, a request to set up payment by the multiple future instalments (this may include confirming the detailed request). This may include receiving a short message service (SMS) text message, an application notification on the mobile device 7, or an email from the instalment payment server 5. In one example, the customer 3 may be required to log into an application or a website associated with the instalment payment server 5 as shown in FIGS. 5*a* to 5*c*. FIG. 5*a* illustrates an interface 41, on a touchscreen, for the customer to enter their customer identifier and a password. FIG. 5*b* illustrates a prompt 43 for the customer 3 to enter the proposed total amount 31. In some examples, the customer 3 may wish to enter a proposed total amount that is larger than the anticipated total amount 31 for the goods or services 21. This may allow the customer 3 to have a buffer and/or purchase more items (or items at a higher price), or at a different exchange rate than initially anticipated, or to make multiple transactions (such as at different stores).

FIG. 5*c* illustrates an interface 45 where the customer can enter banking details 47. This may include credit card details and debit card details. In some other examples, this may include a customer's bank account details. The banking details 47 may include the customer's nominated account from which payments for the future instalments can be withdrawn from. FIG. 5*c* also details some of the payment terms 49 for the multiple future instalments. In this example, the total amount is $160 whereby the multiple future instalments include four instalments at $40 each. The instalments are to be made every 14 days. It is to be appreciated that this is only an example and other periods, amounts and other terms may be used. It is also to be appreciated that some of these steps may include the determination in step 260 described herein that is provided in FIG. 5*c* for the customer's review.

At the lower portion of the interface 45 is a confirmation icon 51. When the customer 3 is satisfied with the terms, the mobile device 7 may receive 103 the customer's confirmation via selecting the confirmation icon 51 on the mobile device 7. In turn, the mobile device 7 may then send 110, over the communications network 15, an indication and/or confirmation to the instalment payment server 5 to set up the payment by the multiple future instalments.

The instalment payment server 5 may then receive 210 this indication and/or confirmation. The instalment payment server may then generate 220 first authorisation data indicative of authorisation of the multiple future instalments. Ideally, this first authorisation data is unique to allow identification of the particular authorisation and customer 3. Authorisation of the multiple future instalments may include the instalments payment server 5 checking the customer record 5, including payment history, to determine the likelihood that the customer would fulfil or default on the multiple future instalments. This may also include an authorisation based on the proposed total amount. If authorised, the first authorisation data may then be generated. In some examples, the first authorisation data may be a number and/or text associated with this authorisation. In some other examples, the first authorisation data may be an optical machine readable representation, such as a barcode or QR code. In some other examples, optical machine readable representation may be derivable from the numbers and/or text.

The instalment payment server 5 then sends 230 the first authorisation data, over the communications network 15, that is then received 120 by the mobile device 7. The instalment payment server 5 may also save the first authorisation data and other information related to this authorisation for the customer 3 in data store 18.

The mobile device 7 may then display an optical machine readable representation of the first authorisation data. In some examples, the optical machine readable representation is a barcode based on the first authorisation data. For example, the first authorisation data may include numbers and/or text that are converted (e.g. rendered) at the mobile device to a barcode. In some examples, the optical machine readable representation may be a QR code. In yet another example, the optical machine readable representation may be textual information comprising of numbers and/or text that can be read by the optical scanner 19. Referring to FIG. 5d, the interface 61 of the mobile device 7 shows a barcode 63 as an optical machine readable representation. Corresponding textual information 65 is also displayed which may be an alternative for an optical scanner 19 or an operator to use for receiving information related to the first authorisation data.

FIG. 5d also includes a maximum amount 67 that the customer 3 may use for the total amount. This maximum amount may be greater than the anticipated total amount to allow a buffer. Also shown are other term 69, such as an expiry time for when the particular authorisation is to be used.

Once the optical machine readable representation is on the display, the customer 3 may then present this to the optical scanner 19 of the POS system 13. This allows scanning 310 of the machine readable representation of the first authorisation data. This would be analogous to how a customer 3 would, in a normal transaction, present cash or a credit card/debit card to a merchant 11 as payment.

In turn, the POS system 13 may then send 330 the second authorisation data representing the scanned optical machine readable representation and merchant data, over the communications network 15, to be received at the instalment payment server 5. The POS system 13 may also send, or resend, the purchasing data to the instalment payment server 5, although it is appreciated that this information may have already been sent 303 previously so that in some examples this may not be necessary. Nonetheless, purchasing data may be sent again to the instalment payment server 5 to confirm the total amount.

The instalment payment server 5 may then determine the customer 3 based on the second authorisation data. This may include comparing the second authorisation data with the first authorisation data and/or customer records saved in the data store 18.

The method also includes determining 260 the validity of multiple future instalments. For example, this may include determining that the authorisation for payment by multiple future instalments has not expired (in time). This may also include determining that the total amount in the purchasing data (or the cumulative value with other total amounts outstanding for the customer) does not exceed the specified maximum amount. It may also include determining that other terms and conditions are fulfilled or likely to be fulfilled.

The step of determining the validity of multiple future instalments may also include determining the multiple future instalments. In some examples, the actual total amount may be the same as the anticipated total amount as discussed above. Therefore determining the multiple future instalments may include retrieving, from a data store 18, payments terms 49 including the value and timing of the instalments (such as $40 dollars for each instalments made every 14 days in the above example). In other examples, determining the multiple future instalments may include recalculating the multiple future instalments. This may be required if additional goods or services 21 are purchased and/or there are fluctuations in the total amount (such as for goods or services 21 with a floating price or currency fluctuations). The step of determining 260 the multiple future instalments 33 may also include determining that the multiple future instalments are valid. Based on determining the validity of multiple future instalments, the instalment payment server 5 then sends 270, over the communications network 15, a confirmation to the POS system 13 to generate an indication that one or more goods or services can be released to the customer 3. The operator at the merchant 11, on receiving this indication, may then allow the customer 3 to leave with the goods or services. Furthermore, the instalment payment server 5 may also send a notification to the mobile device 7 to notify the customer 3 of the approval of payment by multiple future instalments.

The method further includes the instalment payments server 5 initiating 280 the multiple future instalments 33. As noted above, this may include sending to the financial service provider 23 a request to debit a customer account (including an account associated with a bank account, credit card, debit card, etc.) for the multiple future instalments at respective points in time.

The institution 9 may also make a payment, or guarantee a payment, of the total amount 31 to the merchant 11, either directly, or alternatively indirectly through the financial service provider 23. In some examples, this may be done at or around the same time of sending the confirmation 270. In some examples, this may be done within a specified period, for example within 24 hours, 48 hours, or 72 hours, etc. This provides certainty to the merchant 11 that they will be paid and improves cash flow for the merchant 11. Importantly, in some examples this results in the merchant receiving the total amount 11 before the customer 3 has fulfilled all the multiple future instalments.

Example of Facilitating Payment Initiated by Preapproval Before Checkout

Another example will now be described with reference to FIGS. 2, 5 and 6. In this alternative example, the customer 3 may wish to receive preapproval for making payment for a total amount comprising multiple future instalments before checking out. For example, the customer 3 may wish to receive preapproval for a specified amount before they enter a merchant 11 (or multiple merchants) so that they can budget for their purchases.

The customer device 7 may receive 105, from a user interface, a request to preapprove a proposed amount. Referring to FIG. 5b, this may include the customer 3 entering into the prompt 43 a proposed total amount that they want to preapprove.

The customer device 7 then sends, over the communications network 15, to the instalment payment server 5 the indication to set up payment by multiple future instalments, including the proposed total amount.

The instalment payments server 5 then determines 211 that the proposed total amount is less than or equal to a specified maximum amount for the customer 3. For example, the specified maximum amount may be a limit the institution 9 is willing to risk with the particular customer 5. It is to be appreciated that in some examples that this may include determining that the proposed total amount is within a specified range.

The instalment payment server 5 may then generate 220 the first authorisation data indicative of an authorisation (i.e. preapproval) of the multiple future instalments, whereby this step is conditional on the result of determining 211 that the proposed total amount is less than or equal to the specified maximum amount.

The first authorisation data may then be sent 230 to the mobile device 7. Referring to FIG. 5d, this positive preapproval may be shown at a display of the mobile device 7 showing a preapproved maximum amount 67 (which may be based on or equal to the proposed total amount). This also shows the optical machine readable representation in the form of a barcode 67 as well as other terms 67 such as an expiry time.

Once the customer 3 has received this first authorisation data, the customer 3 may then be confident that they will be able to make purchases at any merchant 11 (that uses this payment system 1) for goods or services 21 up to the value of the preapproved maximum amount 67. Thus the customer 3 may be free to look at different merchants 11 before deciding to make purchases up to their budgeted preapproved amount.

Once the customer 3 has decided to make the purchase of goods or services 21 at a particular merchant 11, the customer 3 can present the mobile device 7 displaying 130 the optical machine readable representation of the first authorisation data to the merchant POS system 13. The optical scanner 19 of the merchant POS system 13 may then scan 310 the optical machine readable representation. The merchant POS system 13 may also receive 320 purchasing data for the goods or services as described above. Subsequently, the merchant POS system 13 sends 330 the purchasing data, merchant data and second authorisation data representing the scanned optical machine readable representation, over the communications network 15, to be received 240 by the instalment payment server 5. The instalment payment server 5 (and other parts of the system 1) can then perform the successive steps as described above.

Variations

In some examples, the step of generating 220 the first authorisation data indicative of an authorisation of the multiple future instalments is conditional on determining authority to debit a customer bank account for the multiple future instalments 33. For example, this may include determining that the credit card/debit card details provided by the customer 3 through the mobile device 7 are valid details. In one example, this may include the instalment payment server 5 requesting confirmation from the financial services provider 23 that the credit/debit card details are valid and that payments can be received from the respective customer bank account. In other examples, this may include debiting a nominal amount from the credit/debit card (e.g. a small amount of currency, such as $1). In other examples, this may include subsequently refunding (or reversing) the nominal amount to the customer bank account.

Initial Payment (Deposit Value)

In some examples, the methods described above may further include receiving a deposit value from a customer before the step of sending 270 the confirmation to the merchant POS system 13. In some examples, this may include receiving a first instalment payment 33*a* (or equivalent thereof) as the deposit value. In some examples, the deposit value is equal to or greater than a first multiple future instalment 33*a* or anticipated first multiple future instalment.

1. Receiving Initial Payment at Authorisation

In some examples, the deposit value may be debited from a customer account at (or around the time of) generating 220 and sending 230 the first authorisation data. For example, the method may include charging a portion of the total amount (or the proposed total amount) as part of the approval process. In some examples, the deposit value may be deducted from a nominated customer account specified by the customer 3. Based on determining that the amount has been received from the customer, the method may then include sending 230 the first authorisation data to the mobile device. In one example of facilitating payment initiated by preapproval, this may include receiving a portion of the proposed total amount to be held as a deposit for the duration that the first authorisation data is valid. If the first authorisation data is not used for a corresponding purchase of goods or services for the total amount, the deposit may then be credited back to the customer account.

2. Receiving Initial Payment at Point of Sale

In another example, the terms of the authorisation may require the customer 3 to pay a proportion of the total amount at the time of (including around the time of) receiving the goods or services 21. Thus in another example, the instalment server 5 may, as part of the step of determining 260 the validity of multiple future instalments, deduct a proportion of the total amount (which may be equal to the first instalment amount). Based on a valid deduction of the proportion of the total amount from the customer's account (whether by direct debit, from a debit card, or credit card), this may be a factor in satisfying the instalment server 5 of the validity of the multiple future instalments. In turn, the confirmation may then be sent 270 to the POS system so that the goods and services can be released.

It is to be appreciated that the deposit value may be received in other ways. In other examples, the customer 3 may present payment of the deposit value to the merchant 11 (such as cash) after which the POS system 1 sends a notification of receipt of the deposit value to the instalment server 5.

3. Receiving Nominal Payment at Authorisation and Initial Payment at Point of Sale In yet another example, the initial payment may be received in a combination of the examples described above. This may include charging a small nominal amount from the customer account at (or around the time of) generating 220 and sending 230 the first authorisation data. For example, this may be a small amount, such as $2 so that the instalment server 5 may be satisfied that the associated debit card, credit card, and customer account is an active account. This may be a sufficient requirement for the instalment server 5 to be satisfied to send the first authorisation data. In some examples, the small nominal amount may be refunded (or reversed) after this process, although it is to be appreciated that the nominal amount may be held on as a small deposit value (which can be credited to the first instalment at a later time).

At the time the customer 3 uses the first authorisation data (i.e. around the time the optical machine readable representation is scanned by the POS system 13, and the instalment payment server 5 determines the validity of the multiple future instalments), the instalment payment server 5 may attempt to debit from the customer account a proportion of the total amount. In some examples, this proportion of the total amount is significantly larger than the total amount and may be equal to the first instalment. As this amount is larger, this may be indicative factor in determining the capacity of the customer 3 to fulfil the future instalment obligations. Thus if there are insufficient funds from the customer's account to debit the proportion of the total amount, the instalment payment server 5 may determine invalidity of multiple future instalments and halt the process. Accordingly, the instalment payment server 5 may send an indication the merchant POS system 13 and the customer mobile device 7 to decline proceeding and to halt the release of goods and services.

Optical Machine Readable Representation

The optical machine readable representation is based on the first authorisation data and may be in various and variable forms.

In some examples, the first authorisation data may include numbers and/or text that are received by the mobile device 7. The mobile device 7 may then render the numbers and/or text to the optical machine readable representation. For example, the numbers and/or text may be rendered to a barcode or Quick Response (QR) code. In other examples, the numbers and/or text may be rendered, including embedded into a picture or logo that can be scanned at the merchant POS system 13.

It is to be appreciated that the optical machine readable representation may, at least in part, be generated on a device other than the mobile device 7. For example, the instalment payment server 5 may generate the barcode or QR code as an image file (e.g. digital image/photo) and send the image file (as the first authorisation data) to the mobile device 7 that in turn displays the image file at a display.

In yet another example, at least part of the first authorisation data may be time limited. This may be used to increase security so that the associated optical machine readable representation is only valid for a window of time. For example, the instalment payment server 5 may send an initial portion of the first authorisation data to the mobile device 7 which, in turn, may be used to generate the optical machine readable representation that is valid for an associated initial time window. Thus when the instalment payment server 5 is determining 260 the validity of the multiple future transactions, this may include determining that the optical machine readable representation was scanned during the initial time window. Once the associated time window has passed, the optical machine readable representation can no longer be validly used for purchases. This may assist in preventing fraudulent use, such as by a fraudulent user intercepting the first authorisation data or from a screen capture (or photo) of the optical machine readable representation from a customer's device.

However, to avoid the customer having to send multiple requests to set up payment after the initial time window has expired, the system may be configured to automatically generate one or more subsequent optical machine readable representations for the customer 3 (e.g. "rolling" optical machine readable representations). Therefore the method may further include sending one or more subsequent portions of the first authorisation data, wherein the subsequent portions has an associated subsequent time window. In turn, an optical machine readable representation of the subsequent portion can then be validly used for the associated subsequent time window.

In some example, each time window may be in the order of minutes, for example 5 minutes, 10 minutes, 15 minutes. Furthermore, there may be an overall time window (and/or number of subsequent portions). For example, authorisation of the multiple future instalments may be available for 12 hours, and portions of the first authorisation data may be sent sequentially to the mobile device 7 so that the multiple smaller associated time windows cover the 12 hour time frame. It is to be appreciated that in some examples, temporally adjacent associated time windows may have some overlap to assist smooth operation of the system.

Account Setup, Login and Active Session Times

The customer may setup an account in a native application on the mobile device 7, or via a web interface on a computing device, by providing details such as an email address, customer name, customer address and a proposed password. The process may also include providing payment method and details such as details of a debit card, bank account number, or credit card. The process may also include verifying the mobile device 7 whereby a confirmation code is sent, via a message, to a phone number associated with the mobile device 7.

When entering the payment method and details, this may include providing a card security code (also known as card verification code, card verification number, card verification value, card verification code, etc.) that is associated with the debit card or credit card. This card security code provides an additional layer of security for card not present transactions. In some examples, the card security code is required once when setting up the account and is not required each time the customer wants to set up payment by the multiple future instalments. However it is to be appreciated that in some circumstances, the system may request the card security code again if there is an interaction that may affect security, for example if the customer changes the password or logs in with a new mobile device 7.

The login process may include using a customer identifier, such as an email address or phone number, coupled with a password. Alternatively, for mobile devices 7 incorporating a biometric sensor (such as a fingerprint scanner), the biometric sensor may be used to assist in identifying and authenticating the customer 3 for the login in process. Once the login is complete, an active session may be open for a specified session time (for example a 60 minute session). After the specified session time has expired, the application (or the website on a server) will automatically log out. This provides an added security measure in case a customer's mobile device is unattended, lost, stolen, etc.

Alternative Example for Requesting Preapproval

Figure 5:
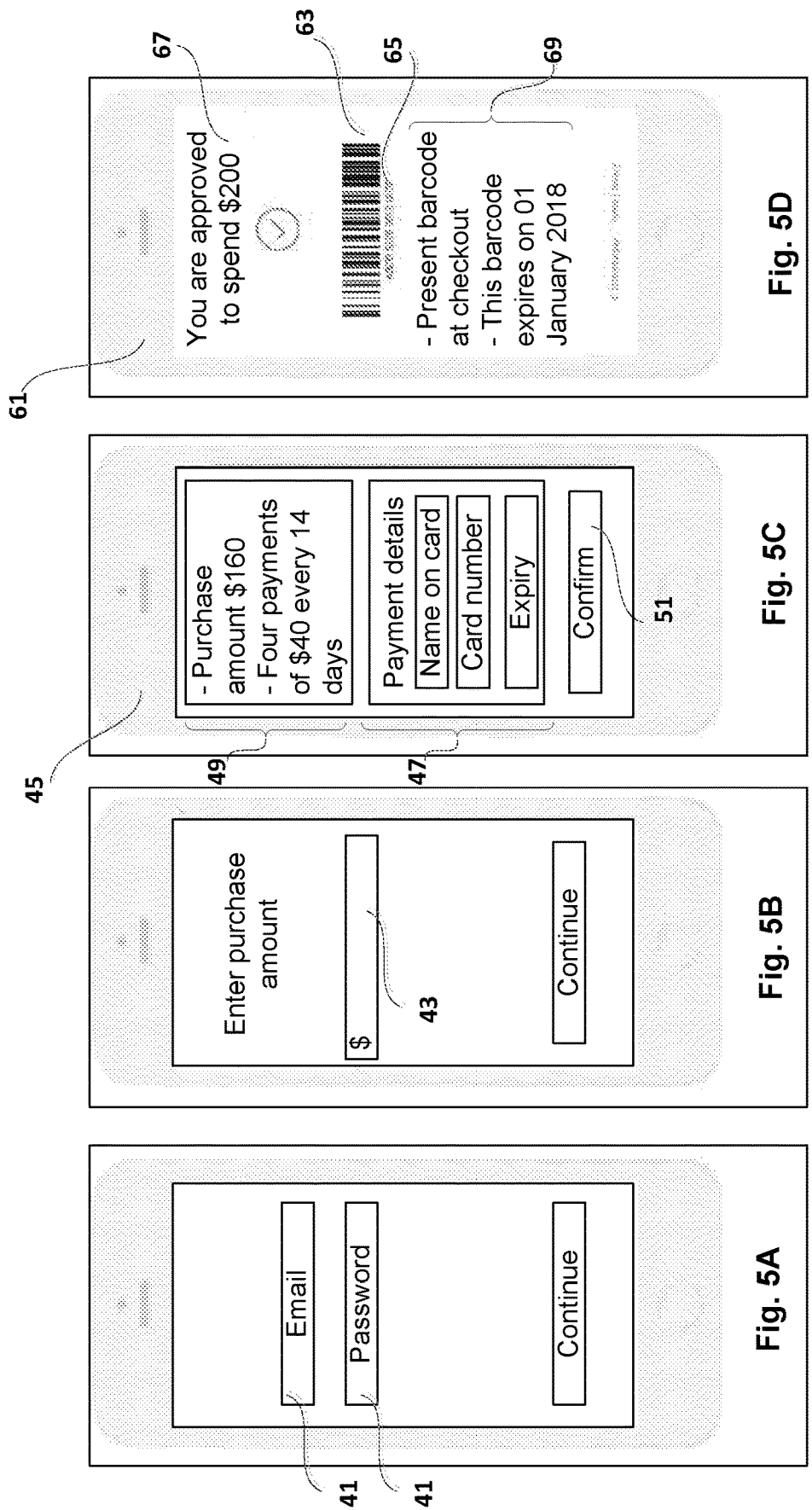
FIGS. 5a to 5d illustrate a series of screenshots of a display of a mobile device of the customer, including a screen shot showing an optical machine readable representation.
Figure 6:
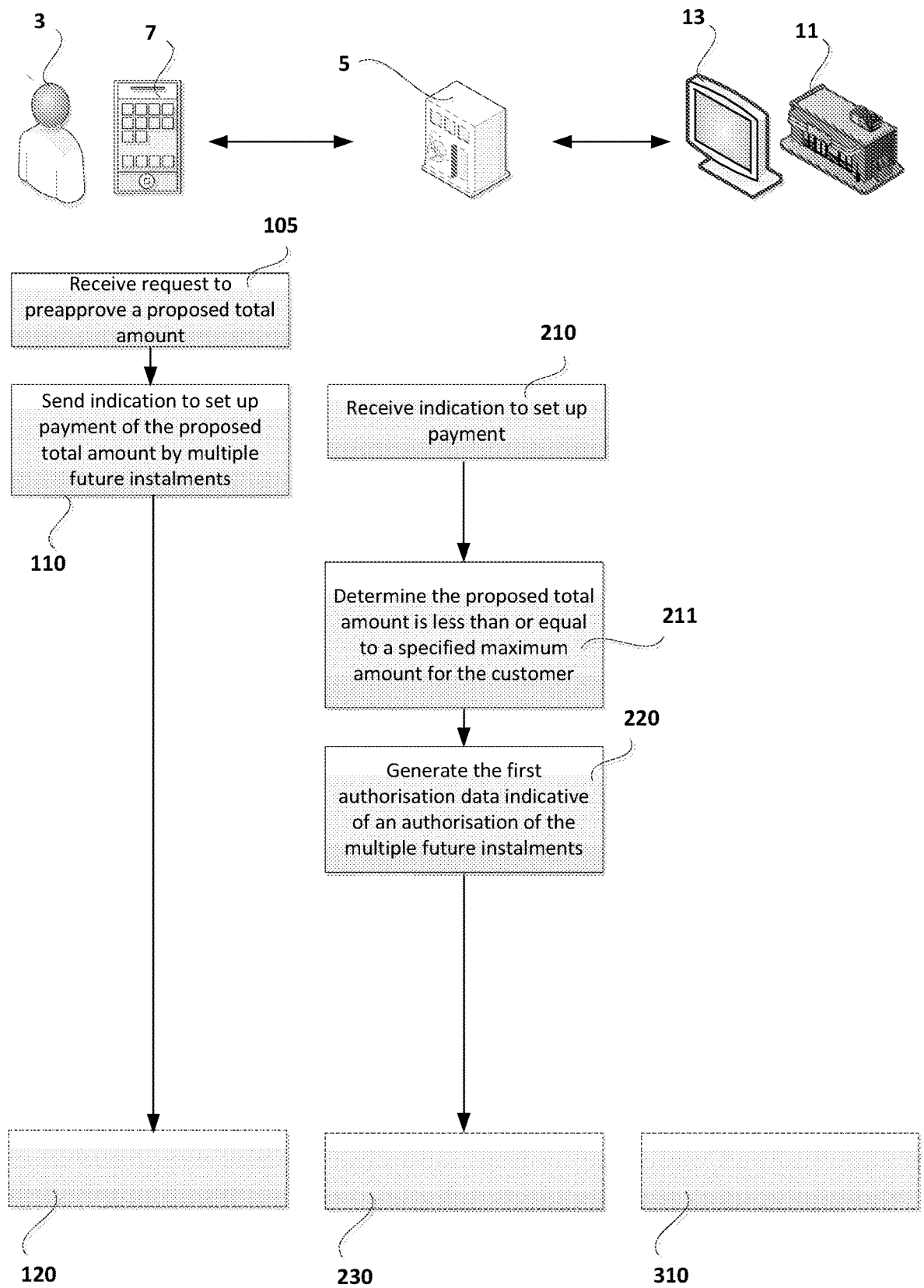
FIG. 6 is a flow chart of the computer-implemented method that is initiated by preapproval at the mobile device before checkout.

In the example shown in FIG. 5, this included a prompt 43 asking the customer 3 to enter the proposed total amount 31. It is to be appreciated that in alternative examples, the customer 3 set a default proposed total amount or nominate the specified maximum threshold as the proposed total amount. The default proposed total amount may be entered during setup of the customer account.

Figure 7A:
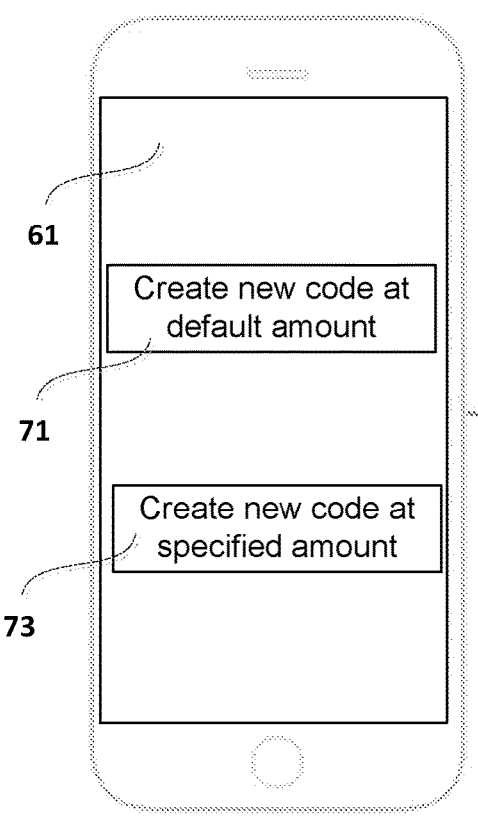
FIGS. 7a to 7c illustrate screenshots of a display of a mobile device initiating a request for preapproval at a default total amount.
Figure 7B:
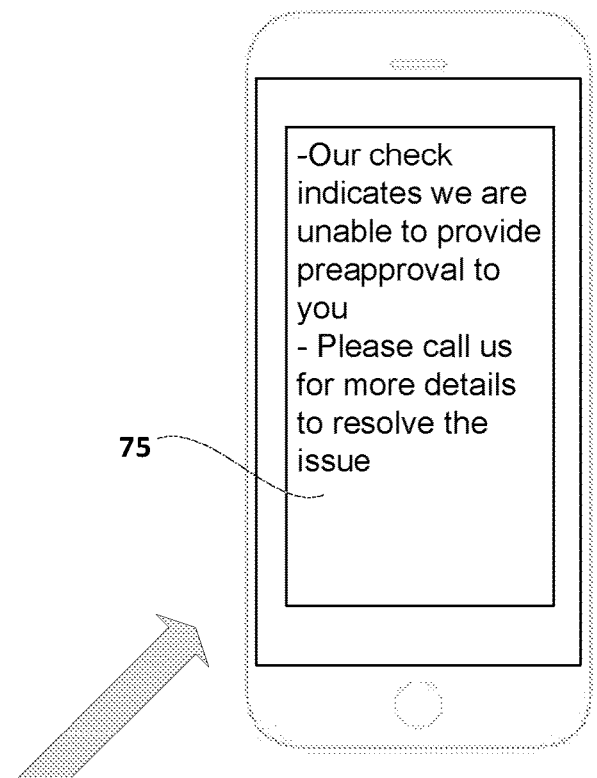
Figure 7C:
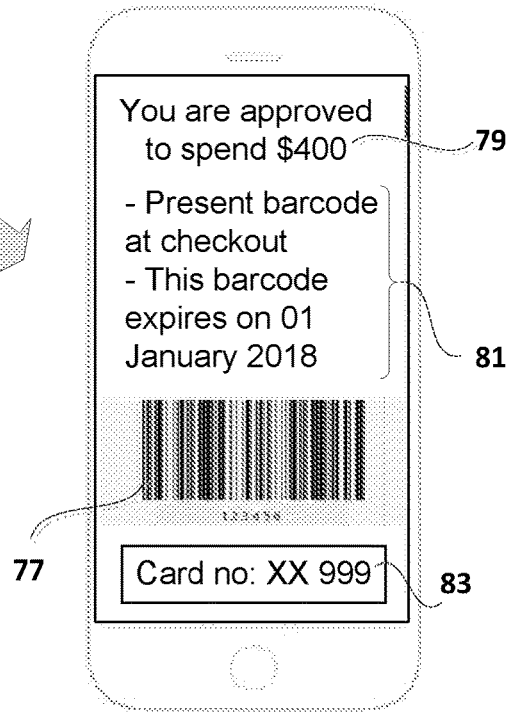

FIG. 7 illustrates a number of screenshots of a display of a mobile device 7 to the customer in an alternative example where a customer 3 may make a request 105 for preapproval at the default proposed total amount. At FIG. 7A a request icon 71 for the default amount allows the customer to send 110 the indication to set up the payment by multiple future instalments to the instalment payment server 5 with a single interaction (e.g. "one click" solution). The instalment payment server 5 may then determine if the customer 3 has authorisation for multiple future instalments, which may include checks as described above. If the customer 3 does not satisfy the requirements and is not provide authorisation, for example if the customer 3 has defaulted on past instalments, the instalment payment server 5 may send a notification to decline the request to the mobile device 7. A decline message 75 may be represented on the mobile device 7 as shown in FIG. 7B, which may specify a reason and instructions to resolve the issue. Alternatively, if the instalment payment server 5 approves, then the first authorisation data is sent to the mobile device 7 and the mobile device then displays a corresponding optical machine readable representation 77 as shown in FIG. 7C. In addition, the default total amount 79 may be shown so the customer is aware of the maximum value associated with the authorisation. Further textual information 81 may be provided, which may include instructions and terms and conditions. An indication 83 of the associated card number or bank account may also be provided.

Referring back to FIG. 7A, the customer may also have the option of specifying an amount via a second request icon 73. This allows the customer to request an alternative amount. This may be advantageous if the customer wants to have multiple preapprovals for use in multiple stores, but has a limited specified maximum threshold. For example, if the specified maximum threshold is $1000 and the customer has a default proposed total amount of $400, the customer may be restricted to two preapprovals as the combined amount is $800 (and that three preapprovals would be $1200 which is above the specified maximum threshold). However, if the customer specifies a preapproval request of $200, then the customer may potentially request five preapprovals for $200. This may allow the customer confidence to plan to make purchases at five different stores for up to $200 each.

In yet another example, it is to be appreciated that an application on the mobile device 7 may, by default, make a request for preapproval upon login or opening the application. For example, if the application determines that there are no current optical machine readable representations available for use and determines that, on this basis, the customer intends to request preapproval. That is, providing a "zero click" solution to the customer once the application is open. In such an example, the application may automatically perform the process to arrive at either FIG. 7B or FIG. 7C.

Hardware

None limiting examples of hardware that may be suitable for the system 1 will now be described.

Mobile Communication Device 9

The mobile device 7 may be a smartphone, a tablet, portable computer etc. The mobile device 7 may include a processing device, data store, and a user interface such as a display, keys, touchscreen, etc. The mobile device 7 may communicate with the communications network 15 via cellular networks, wireless communication network such as Wi-Fi and/or Bluetooth, and may also include the internet.

The mobile device 7 may perform the computer implemented methods described herein. This may include downloading software from an application store to perform the methods described herein. The application store may be an online store accessible via the communications network 15. Examples of application stores (also known as "App store") include Google Play™ (offered by Google, Inc.), App Store™ (offered by Apple, Inc.), Amazon Appstore™ (offered by Amazon.com, Inc.), Windows Phone Store™ or Windows Store™ (offered by Microsoft Corp.). The application store may be on a cloud based server.

Merchant Point of Sale (POS) System 13

The POS system 13 may include an electronic device, such as a computer, tablet computer, mobile communication device, computer server, computer terminal, etc. Such an electronic device may include a processing device and a data store 12. The POS system 13 may include a user interface such as a keyboard, mouse, monitor display, touchscreen display, etc.

The POS system 13 may also include an optical scanner 19, such as a barcode scanner. This may include an active device with a light source to project laser light towards a barcode and an optical sensor to detect reflected light. In other examples, the optical scanner 19 may be a passive device that detects light from the barcode (or other optical machine readable representation.

The Instalment Payment Server 5

The instalment payment server 5 may include one or more processing devices 17 and data store 18. The instalment payment server 5 may be operated by the institution 9. In some examples, the institution may include a financial institution. The data store 18 may store customer information, such as banking details, credit and payment histories, customer loyalty rewards and other details.

The Communications Network 15

In the example illustrated in FIG. 1, the communications network 15 is schematic represented as one network connecting nodes (network elements) such as the instalment payment server 5, the merchant POS system 13, mobile device 7, and the financial service provider processing device 25. However it is to be appreciated that there may be multiple networks for connection between two or more of the above mentioned nodes. For example, the mobile device 7 may be in communication with the instalment payment server 5 via a cellular network and/or the internet. The POS system 14 may be in communication with the server 5 via the internet and/or a separate network. Furthermore, in some examples the instalment payment server 5 may be in communication with the financial service provider processing device 25 via another separate network to maintain security.

Processing Device

Figure 8:
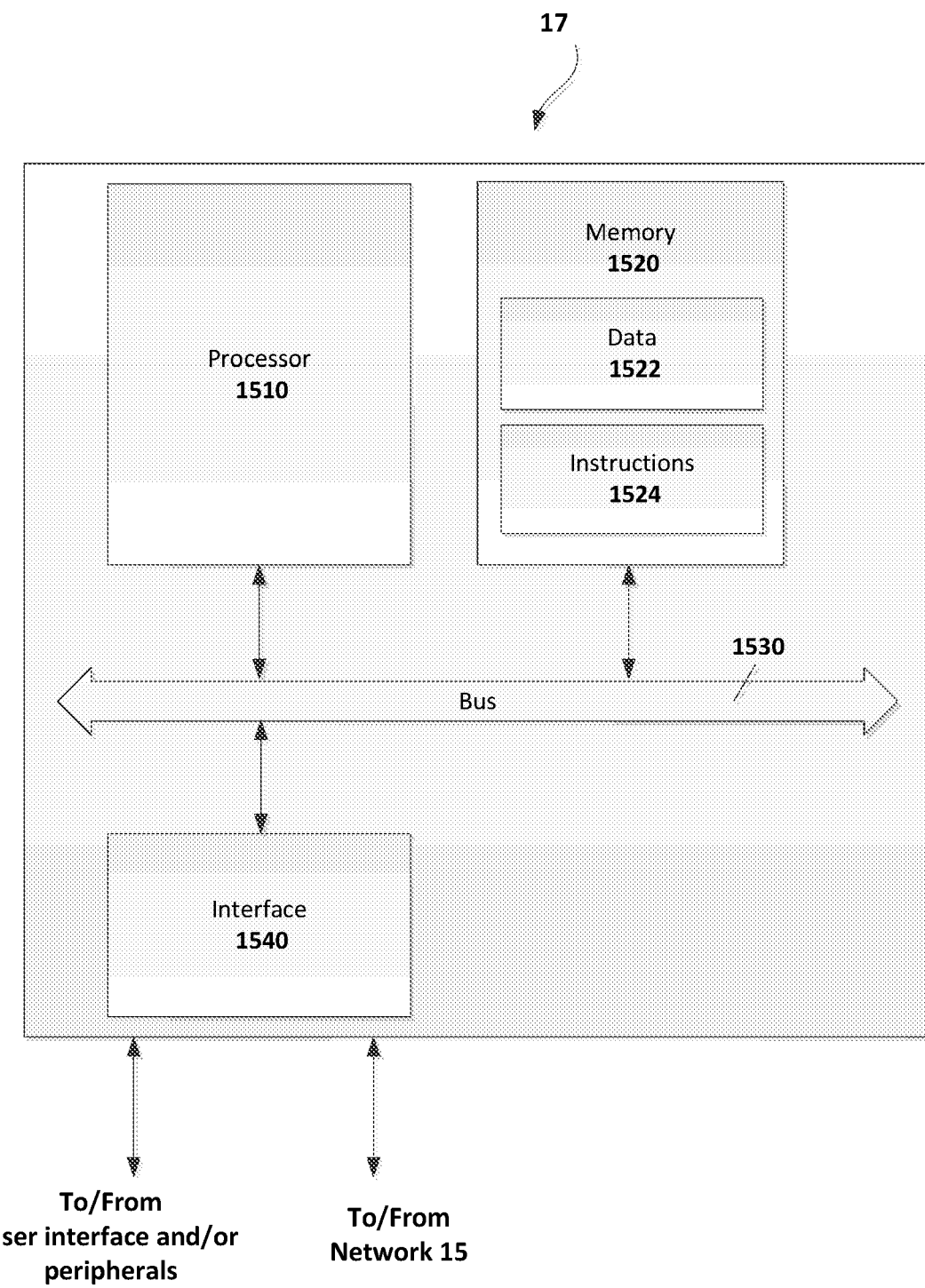
FIG. 8 illustrates a schematic example of a processing device.

FIG. 8 illustrates an example of a processing device 17, 25 than may include processing devices associated with a mobile device 7, POS system 13, instalment payment server 5, and financial services provider device 25. The processing device 17, 25 includes a processor 1510, a memory 1520 and an interface device 1540 that communicate with each other via a bus 1530. The memory 1520 stores instructions and data for implementing one or more of the methods 100, 200, 300, described above, and the processor 1510 performs the instructions (such as a computer program) from the memory 1520 to implement the methods 100, 200, 300. The interface device 1540 may include a communications module that facilitates communication with the communications network 19 and, in some examples, with the user interface and peripherals such as data store 12, 18, 27 and optical scanner 19. It should be noted that although the processing device may be independent network elements, the processing device may also be part of another network element. Further, some functions performed by the processing device may be distributed between multiple network elements. For example, the server 5 may be associated with multiple processing devices and steps of the method 200 may be performed, and distributed, across more than one of these devices (and may, in some examples include the processing devices associated with the mobile device 7 and the POS system 13. Similarly, the POS system 13 at the merchant 11 may include a plurality of individual terminals so that multiple customers may be served at one time.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A computer-implemented method for facilitating payment of a total amount comprising multiple future instalments by a customer, the method comprising:
receiving, at an instalment payment server, an indication from a mobile device associated with the customer to set up the payment by the multiple future instalments;
generating first authorisation data indicative of an authorisation of the multiple future instalments;
sending the first authorisation data to a mobile device;
displaying on the mobile device an optical machine readable representation of the first authorisation data;

scanning, by a merchant point of sale (POS) system associated with a merchant, the optical machine readable representation of the first authorisation data from the mobile device;

receiving, by the merchant POS system, purchasing data for a purchase of one or more goods or services for the total amount;

sending the purchasing data, merchant data and second authorisation data representing the scanned optical machine readable representation to the instalment payment server;

determining, by the instalment payment server, the customer based on the second authorisation data;

determining, by the instalment payment server, validity of multiple future instalments based on the total amount and the authorisation of the multiple future instalments of the determined customer, and based on determining the validity of multiple future instalments:

sending a confirmation to the merchant POS system to cause the merchant POS system to generate an indication that the one or more goods or services can be released to the customer; and initiating the multiple future instalments at respective points in time, wherein the first authorisation data comprises an initial portion, wherein the initial portion has an associated initial time window and determining the validity of multiple future transactions is based on determining that the optical machine representation of the initial portion was scanned by the merchant POS system during the associated initial time window, and wherein in response to the initial time window expiring, the method further comprises sending one or more subsequent portions of the first authorisation data to the mobile device, wherein the subsequent portion has an associated subsequent time window, and determining the validity of multiple future transactions is based on determining that the optical machine representation of the subsequent portion was scanned by the merchant POS system during the associated subsequent time window.

2. The computer-implemented method according to claim 1, further comprising:

determining the multiple future instalments based on the total amount and the authorisation of the multiple future instalments of the determined customer.

3. The computer-implemented method according to claim 1, wherein the step of receiving an indication from a mobile device to set up the payment by the multiple future instalments comprises:

receiving a request to preapprove a proposed total amount;

wherein the step of generating the first authorisation data indicative of an authorisation of the multiple future instalments is conditional on:

determining the proposed total amount is less than or equal to a specified maximum amount for the customer.

4. The computer-implemented method according to claim 1, further comprising the step of:

receiving a deposit value from a customer before the step of sending a confirmation to the merchant POS system.

5. The computer-implemented method according to claim 4, wherein the deposit value is proportional to the total amount or the proposed total amount.

6. The computer-implemented method according to claim 4, wherein the deposit value is equal or greater than a first multiple future instalment from the multiple future instalments.

7. The computer-implemented method according to claim 1, wherein the optical machine readable representation of the first authorisation data is a barcode or QR code.

8. The computer-implemented method according to claim 1, wherein the step of generating the first authorisation data indicative of an authorisation of the multiple future instalments is conditional on:

determining authority to debit a customer bank account for the multiple future instalments.

9. The computer-implemented method according to claim 1, further comprising:

receiving, at the POS system, an indication that the customer intends payment for the total amount by multiple future instalments and a customer identifier;

receiving, at the instalment payment server a request to set up the payment by the multiple future instalments and the customer identifier; and sending, to the mobile device, a request for confirmation to set up the payment by the multiple future instalments, wherein confirmation includes the indication from the mobile device to set up the multiple future instalments.

10. A payment system for facilitating payment of a total amount comprising multiple future instalments by a customer, the method comprising: -a mobile device associated with a customer; -an instalment payment server; -a merchant POS system associated with merchant, wherein the system comprises one or more processing devices associated with the mobile device, instalment payment server and merchant POS system configured to:

receive, at an instalment payment server, an indication from a mobile device to set up the payment by the multiple future instalments;

generate, at an instalment payment server, first authorization data indicative of an authorization of the multiple future instalments; send the first authorization data to a mobile device;

display, on the mobile device, an optical machine readable representation of the first authorization data;

scan, by a merchant POS system, the optical machine readable representation of the first authorization data from the mobile device;

receive, by the merchant POS system, purchasing data for a purchase of one or more goods or services for the total amount;

send, the purchasing data, merchant data and second authorization data representing the scanned optical machine readable representation to the instalment payment server; determine, by the instalment payment server, the customer based on the second authorization data;

determine, by the instalment payment server validity of multiple future instalments based on the total amount and the authorization of the multiple future instalments of the determined customer, and based on determining the validity of multiple future instalments: -send a confirmation to the merchant POS system to cause the merchant POS system to generate an indication that the one or more goods or services can be released to the customer; and initiate, by the instalment payment server, the multiple future instalments at respective points in time, wherein the first authorization data comprises an initial portion, wherein the initial portion has an associated initial time window and to determine the validity of multiple future transactions is based on determining that the optical machine readable representation of the initial portion was scanned by the merchant POS system during the associated initial time window, and wherein in response to the initial time window expiring, the one or more respective processing devices is further configured to:

send one or more subsequent portions of the first authorization data to the mobile device, wherein the subsequent portion has an associated subsequent time window, and to determine the validity of multiple future transactions is based on determining that the optical machine readable representation of the subsequent portion was scanned by the merchant POS system during the associated subsequent time window.

11. The payment system according to claim 10, wherein to receive an indication to set up payment by multiple future instalments comprises the instalment payment server configured to receive a request to preapprove a proposed total amount; and wherein to generate the first authorisation data indicative of an authorisation of the multiple future instalments is conditional on the proposed total amount is less than or equal to a specified maximum amount for the customer.

12. The payment system according to claim 10, wherein the optical machine readable representation of the first authorisation data is a barcode or quick response (QR) code.

13. The payment system according to claim 10, wherein the POS system is configured to receive an indication that the customer intends payment for the total amount by multiple future instalments and a customer identifier;

wherein the instalment payment server is configured to receive, from the POS system, a request to set up the payment by the multiple future instalments and the customer identifier; and wherein the instalment payment server is configured to send to the mobile device, a request for confirmation to set up the payment by the multiple future instalments, wherein confirmation includes the indication from the mobile device to set up the multiple future instalments.

* * * * *

UNITED STATES PATENT AND TRADEMARK OFFICE
CERTIFICATE OF CORRECTION

| | | |
|---|---|---|
| PATENT NO. | : 11,348,085 B2 | |
| APPLICATION NO. | : 16/317450 | |
| DATED | : May 31, 2022 | |
| INVENTOR(S) | : Nicholas Molnar et al. | |

It is certified that error appears in the above-identified patent and that said Letters Patent is hereby corrected as shown below:

On the Title Page

Item [57], Line 10, change "continuation" to --confirmation--.

Item [57], Line 13, change "initialing" to --initiating--.

Signed and Sealed this
Twenty-ninth Day of November, 2022

*Katherine Kelly Vidal*

Katherine Kelly Vidal
*Director of the United States Patent and Trademark Office*